(12) United States Patent
Serrao et al.

(10) Patent No.: US 10,247,205 B2
(45) Date of Patent: Apr. 2, 2019

(54) ACCUMULATOR RACKS

(71) Applicant: DANA ITALIA SPA, Arco (IT)

(72) Inventors: Lorenzo Serrao, Nago-Torbole (IT); Giulio Ornella, Arco (IT); Ettore Cosoli, Padua (IT)

(73) Assignee: Dana Italia SPA, Arco (IT)

( * ) Notice: Subject to any disclaimer, the term of this patent is extended or adjusted under 35 U.S.C. 154(b) by 412 days.

(21) Appl. No.: 15/330,060

(22) PCT Filed: Feb. 3, 2015

(86) PCT No.: PCT/EP2015/052211
§ 371 (c)(1),
(2) Date: Jul. 29, 2016

(87) PCT Pub. No.: WO2015/117961
PCT Pub. Date: Aug. 13, 2015

(65) Prior Publication Data
US 2017/0037875 A1 Feb. 9, 2017

Related U.S. Application Data

(60) Provisional application No. 61/935,665, filed on Feb. 4, 2014.

(51) Int. Cl.
*B60K 6/12* (2006.01)
*F15B 1/02* (2006.01)
(Continued)

(52) U.S. Cl.
CPC ............... *F15B 1/027* (2013.01); *B60K 6/12* (2013.01); *F15B 1/024* (2013.01); *F15B 1/033* (2013.01);
(Continued)

(58) Field of Classification Search
CPC ....... B60K 6/12; B60Y 2400/10; F15B 1/024; F15B 1/027; F15B 1/033; F15B 1/04;
(Continued)

(56) References Cited

U.S. PATENT DOCUMENTS 4,760,697 A 8/1988 Heggie et al.
4,815,334 A 3/1989 Lexen
(Continued)

FOREIGN PATENT DOCUMENTS

CN 1394273 1/2003
CN 201176978 Y 1/2009
(Continued)

OTHER PUBLICATIONS

Machine-generated English Translation of DE19931208, obtained via Espacenet Patent Search.
(Continued)

*Primary Examiner* — Logan Kraft
(74) *Attorney, Agent, or Firm* — Marshall & Melhorn, LLC (57) ABSTRACT

A method of charging a hydro-pneumatic energy storage system is described. The system has a first hydro-pneumatic accumulator with a first hollow vessel. Disposed within the first hollow vessel is a first compressible volume containing a first amount of gas. The system has a second hydro-pneumatic accumulator with a second hollow vessel. Disposed within the second hollow vessel is a second compressible volume containing a second amount of gas. The gas contained in the first volume is pre-pressurized to a first hydrostatic pre-charge pressure and the gas contained in the second volume is pre-pressurized to a second hydrostatic pre-charge pressure. The second pre-charge pressure is higher than the first pre-charge pressure. In addition, the gas in the first volume is pressurized by discharging a non-compressible hydraulic fluid into the first vessel while keeping a quantity of non-compressible hydraulic fluid contained in the second vessel constant to keep the pressure of the gas contained in the second volume at the second pre-charge pressure.

18 Claims, 6 Drawing Sheets

(51) Int. Cl.
*F15B 1/027* (2006.01)
*F15B 1/033* (2006.01)
*F15B 1/04* (2006.01)
*F15B 1/08* (2006.01)
*F16H 61/4096* (2010.01)

(52) U.S. Cl.
CPC ............... *F15B 1/04* (2013.01); *F15B 1/08* (2013.01); *F16H 61/4096* (2013.01); *B60Y 2400/10* (2013.01); *F15B 2201/205* (2013.01); *F15B 2201/405* (2013.01); *F15B 2201/4155* (2013.01); *F15B 2201/51* (2013.01); *Y02E 60/15* (2013.01)

(58) Field of Classification Search
CPC ............... F15B 1/08; F15B 2201/205; F15B 2201/405; F15B 2201/4155; F15B 2201/51; F16H 61/4096; Y02E 60/15
See application file for complete search history.

(56) References Cited

U.S. PATENT DOCUMENTS

| | | | |
|---|---|---|---|
| 5,518,461 | A | 5/1996 | Pfordt |
| 5,579,640 | A | 12/1996 | Gray, Jr. et al. |
| 5,887,674 | A | 3/1999 | Gray, Jr. |
| 6,622,484 | B2 | 9/2003 | Hopkins |
| 6,719,080 | B1 | 4/2004 | Gray, Jr. |
| 7,669,414 | B2 | 3/2010 | Loeffler |
| 7,870,727 | B2 | 1/2011 | Mueller et al. |
| 7,926,265 | B2 | 4/2011 | Mueller et al. |
| 7,934,779 | B2 | 5/2011 | Kodama |
| 7,984,783 | B2 | 7/2011 | Gray, Jr. et al. |
| 8,108,111 | B2 | 1/2012 | Stein et al. |
| 8,162,094 | B2 | 4/2012 | Gray, Jr. et al. |
| 8,616,323 | B1 | 12/2013 | Gurin |
| 8,959,905 | B2 | 2/2015 | Baltes et al. |
| 8,991,167 | B2 | 3/2015 | Yuan et al. |
| 9,032,723 | B2 | 5/2015 | Haugen |
| 9,057,389 | B2 | 6/2015 | Opdenbosch |
| 9,096,115 | B2 | 8/2015 | Ho |
| 9,765,502 | B2 | 9/2017 | Heybroek |
| 9,802,469 | B2 | 10/2017 | Ornella |
| 2004/0251067 | A1 | 12/2004 | Gray, Jr. et al. |
| 2006/0243515 | A1 | 11/2006 | Okada et al. |
| 2009/0165451 | A1 | 7/2009 | Mueller |
| 2011/0232418 | A1 | 9/2011 | Gray, Jr. et al. |
| 2011/0314801 | A1 | 12/2011 | Baltes et al. |
| 2012/0090308 | A1 | 4/2012 | Yuan et al. |
| 2012/0178570 | A1 | 7/2012 | Gray, Jr. et al. |
| 2012/0233991 | A1 | 9/2012 | Ivantysynova et al. |
| 2012/0240564 | A1 | 9/2012 | Wesolowski et al. |
| 2013/0081385 | A1 | 4/2013 | Opdenbosch |
| 2013/0133318 | A1 | 5/2013 | Vogl et al. |
| 2013/0240068 | A1* | 9/2013 | Samara-Rubio ......... F15B 1/24 137/571 |
| 2015/0113969 | A1 | 4/2015 | Kochhan et al. |
| 2016/0059694 | A1 | 3/2016 | Heren |
| 2016/0341309 | A1 | 11/2016 | Serrao |
| 2016/0361986 | A1 | 12/2016 | Ornella |
| 2017/0015197 | A1 | 1/2017 | Lambey |
| 2017/0067489 | A1 | 3/2017 | Versteyhe |
| 2017/0072778 | A1 | 3/2017 | Ornella |
| 2017/0305267 | A1 | 10/2017 | Ornella |
| 2017/0335867 | A1 | 11/2017 | Meehan |

FOREIGN PATENT DOCUMENTS

| | | |
|---|---|---|
| CN | 102518169 A | 6/2012 |
| CN | 102734237 A | 10/2012 |
| DE | 19931208 A1 | 1/2001 |
| DE | 102006017581 A1 | 9/2007 |
| DE | 102006060014 B4 | 5/2009 |
| DE | 102009056153 A1 | 6/2011 |
| DE | 102011005356 A1 | 9/2012 |
| DE | 102011055178 A1 | 5/2013 |
| EP | 0615077 A1 | 9/1994 |
| EP | 1963686 B1 | 10/2011 |
| FR | 2971741 A1 | 8/2012 |
| WO | 96/34213 A1 | 10/1996 |
| WO | 9713650 A1 | 4/1997 |
| WO | 0151870 A1 | 7/2001 |
| WO | 2007035997 A1 | 4/2007 |
| WO | 2008012558 A2 | 1/2008 |
| WO | 2010072299 A1 | 7/2010 |
| WO | 2011112663 A2 | 9/2011 |
| WO | 2012/125798 A1 | 9/2012 |
| WO | 2013121126 A1 | 8/2013 |
| WO | 2013159851 A1 | 10/2013 |

OTHER PUBLICATIONS

Machine-generated English Translation of CN201176978, obtained via Espacenet Patent Search.
Machine-generated English Translation of CN102518169, obtained via Espacenet Patent Search.
Machine-generated English Translation of CN102734237, obtained via Espacenet Patent Search.
Chinese Office Action issued by the Chinese State Intellectual Property Office dated Sep. 20, 2017.
The State Intellectual Property Office of the People's Republic of China; Office Action issued in the parallel Chinese application No. CN201580006877.4; dated Apr. 21, 2017; 15 pages; The State Intellectual Property Office of the People's Republic of China, Beijing, Republic of China.
European Patent Office, International Search Report and Written Opinion of PCT/EP2015/052211, dated May 15, 2015, 11 pages, European Patent Office, Rijswijk, Netherlands.

* cited by examiner

ACCUMULATOR RACKS

The present document claims priority from U.S. Provisional Patent App. No. 61/935,665 filed on Feb. 4, 2014, which is hereby incorporated by reference in its entirety.

The invention primarily relates to a hydro-pneumatic energy storage system and to methods of charging and of discharging the storage system. Hydro-pneumatic energy storage systems typically find application in working machines used in agriculture, mining or construction, for example.

BACKGROUND OF THE INVENTION

Hydro-pneumatic energy storage systems usually include at least one hydro-pneumatic accumulator, the accumulator comprising a rigid hollow vessel that encloses a storage space. Normally, the storage space is divided into a closed compressible volume filled with an amount of a process gas such as nitrogen and into a variable space for receiving a non-compressible hydraulic fluid such as oil. Typically, the variable space is in fluid communication with an exterior of the vessel through one or more valves.

Energy may be stored in the system by discharging a quantity of a non-compressible hydraulic fluid into the variable space inside the vessel such that the process gas contained in the closed volume inside the vessel is compressed and pressurized. The gas may then be kept in the pressurized state by closing the valve. When needed, the hydrostatic energy stored in the pressurized gas may be released by opening the valve and by letting the gas expand, the expanding gas thereby displacing the non-compressible hydraulic fluid stored within the vessel out of the vessel, thus creating a fluid flow. The flow of hydraulic fluid generated by the expanding gas may then drive a hydraulic device such as a hydraulic motor or a hydraulic piston, for example.

It is known that the amount of energy that may be stored in a hydro-pneumatic energy-storage system may be increased by increasing the system size and/or by increasing the precharge pressure of the process gas. However, space for accommodating the accumulators of the storage system is often limited. Furthermore, the precharge pressure of the process gas usually has to more or less match the operating pressure of the hydraulic circuit to which the storage system is intended to be connected.

SUMMARY OF THE INVENTION

It is therefore an object of the present invention to design a hydro-pneumatic energy storage system with an increased energy density which is compatible with the operating conditions of the hydraulic circuit to which it is intended to be connected. It is another object of the present invention to specify methods of charging and of discharging the system.

This problem is solved by the methods of charging and of discharging a hydro-pneumatic energy storage system according to the independent claims and by a hydro-pneumatic energy storage system configured to carry out these methods as specified in the subordinate system claim.

Thus, a method of charging a hydro-pneumatic energy storage system is proposed. The system includes a first hydro-pneumatic accumulator comprising a first rigid hollow vessel. A storage space enclosed by the first vessel comprises a first compressible volume filled with a first amount of gas, and the storage space enclosed by the first vessel comprises a first variable space for receiving a non-compressible hydraulic fluid. The system further includes a second hydro-pneumatic accumulator comprising a second rigid hollow vessel. A storage space enclosed by the second vessel comprises a second compressible volume filled with a second amount of gas, and the storage space enclosed by the second vessel comprises a second variable space for receiving a non-compressible hydraulic fluid.

The method for charging the system comprises the steps of:
  pre-pressurizing the gas contained in the first volume to a first hydro-static precharge pressure $p_{01}$ and pre-pressurizing the gas contained in the second volume to a second hydrostatic precharge pressure $p_{02}$, the second precharge pressure being higher than the first precharge pressure: $p_{02} > p_{01}$;
  pressurizing the gas in the first volume by discharging a non-compressible hydraulic fluid into the first vessel while keeping a quantity (possibly zero) of non-compressible hydraulic fluid contained in the second vessel constant to keep the pressure of the gas contained in the second volume at the second precharge pressure $p_{02}$; and,
  when the pressure of the gas in the first volume reaches the second precharge pressure $p_{02}$, pressurizing the gas in the second volume by discharging a non-compressible hydraulic fluid into the second vessel.

The following may illustrate the advantage of the method according to the present invention over a conventional method of charging a hydro-pneumatic energy storage system. It is assumed that both the conventional system and the system according to the invention have the same total precharge volume $V_0$.

According to the conventional method, the entire precharge volume $V_0$ (which may possibly be distributed over different accumulators) is pre-pressurized to the same precharge pressure $p_{01}$. According to the conventional method, charging the system includes uniformly increasing the pressure throughout the system. That is, according to the conventional method, the pressure is By contrast, according to the method of the present invention, a fraction of the total precharge volume $V_0$ is pre-pressurized to the same precharge pressure $p_{01}$ as in the conventional system (the first compressible volume in the first accumulator), while another fraction (the second compressible volume in the second accumulator) is pre-pressurized to a precharge pressure $p_{02}$ with $p_{02} > p_{01}$. Further, the total precharge volume $V_0$ is compartmentalized and at least the first volume is charged separately such that any volume of the non-compressible hydraulic fluid that is discharged into the system causes a larger pressure increase and deposits a larger amount of energy in the system according to the invention than in the conventional system.

Furthermore, in many types of hydro-pneumatic accumulators, the maximum attainable compression ratio is limited. For example, in a bladder-type accumulator the pressure of the process gas inside the bladder should not be increased above about $4 \cdot p_0$, where $p_0$ is the precharge pressure. Therefore, the presently proposed compartmentalization may extend the accessible pressure range of the system. For example, assuming that the first accumulator and the second accumulator are bladder-type accumulators, the second precharge pressure $p_{02}$ may be set to the maximum pressure of the gas in the first accumulator, that is to $p_{02} = 4 \cdot p_{01}$. The gas in the second accumulator may then be pressurized up to a maximum pressure of $4 \cdot p_{02} = 4 \cdot 4 \cdot p_{01} = 16 \cdot p_{01}$.

The first precharge pressure $p_{01}$ may be a pressure compatible with the operating pressure of a hydraulic system or circuit to which the accumulators are connectable. Furthermore, the non-compressible hydraulic fluid is typically discharged into the two accumulators through the same feed pipe. Initiating the process of discharging the non-compressible hydraulic fluid into the second accumulator only when or only once the pressure of the process gas in the first accumulator has reached the second precharge pressure $p_{02}$ may therefore guarantee a smooth transition from the process of charging of the first accumulator to the process of the charging of the second accumulator.

The proposed charging method may further include the step of:

when the pressure of the gas in the first volume reaches a first maximum pressure which is equal to or higher than the second precharge pressure, keeping the quantity of non-compressible hydraulic fluid contained in the first vessel constant to keep the pressure of the gas in the first volume at the first maximum pressure. The first maximum pressure may be a pressure limit of the first accumulator above which the gas in the first volume may not be pressurized without causing potential damage to the first accumulator, for example.

Pre-pressurizing the gas contained in the first volume to the first precharge pressure may include adjusting the first amount of gas, and pre-pressurizing the gas contained in the second volume to the second hydrostatic precharge pressure may include adjusting the second amount of gas. For example, the first volume and the second volume may be in fluid communication with a compressor through corresponding valves. As opposed to pre-pressurizing the gas contained in the first and the second volume by discharging a non-compressible hydraulic fluid into the first and the second vessel, respectively, pre-pressurizing the gas contained in the accumulators by adjusting the amount of gas in the first and the second volume does not come at the cost of a decreased precharge volume.

The non-compressible hydraulic fluid may be discharged into the first vessel and into the second vessel through a hydraulic displacement unit driven by an engine or by a vehicle output of an automotive vehicle. For example, the proposed system may be in fluid communication with a hydrostatic circuit of a series hydraulic hybrid transmission of a vehicle, typically an off-highway vehicle.

Also, a method of discharging the above descriebed hydro-pneumatic energy storage system is proposed. As is readily apparent to a skilled person, the proposed discharging method reverses the above described charging method.

The starting point of the method is a state of the system where the first vessel is at least partially filled with the non-compressible hydraulic fluid and the gas in the first volume is pressurized to a first maximum pressure. The first maximum pressure is not necessarily the upper pressure limit of the first accumulator (although it may be). The term is merely intended to indicate that the pressure of the gas in the first volume decreases from here.

Similarly, the starting point of the proposed discharging method includes the second vessel being at least partially filled with the non-compressible hydraulic fluid and the gas in the second volume being pressurized to a second maximum pressure which is equal to, or more typically, higher than the first maximum pressure. Again, the second maximum pressure is not necessarily the upper pressure limit of the second accumulator (although it may be). The term is merely intended to indicate that the pressure of the gas in the second volume decreases from here.

The method of discharging the system comprises the steps of:

letting the gas contained in the second volume expand to at least partially displace the non-compressible hydraulic fluid contained in the second vessel out of the second vessel while keeping the quantity of non-compressible hydraulic fluid contained in the first vessel constant to keep the pressure of the gas in the first volume at the first maximum pressure;

when the pressure of the gas contained in the second volume has fallen to the first maximum pressure, letting the gas contained in the first volume expand to at least partially displace the non-compressible hydraulic fluid contained in the first vessel out of the first vessel;

when the pressure of the gas contained in the second volume has fallen to a second precharge pressure which is equal to or smaller than the first maximum pressure, halting the expansion of the gas contained in the second volume to keep the pressure of the gas contained in the second volume at the second precharge pressure; and when the pressure of the gas contained in the first volume has fallen to a first precharge pressure which is smaller than the second precharge pressure, halting the expansion of the gas contained in the first volume to keep the pressure of the gas contained in the first volume at the first precharge pressure.

The non-compressible hydraulic fluid displaced out of the first vessel and out of the second vessel may be fed into the same feed pipe and diverted to a hydraulic displacement unit drivingly engaged with an engine or with a vehicle output of an automotive vehicle to drive the displacement unit. The vehicle output may comprise at least one of a gearbox, a drive shaft, a final drive, a vehicle axle and one or more wheels, for example.

Referring to both the proposed charging method and the proposed discharging method, the following relation may hold: $(p_{max,1}-p_{02})/(p_{02}-p_{01}) \leq 0.2$, preferably in $(p_{max,1}-p_{02})/(p_{02}-p_{01}) \leq 0.1$, more preferably $(p_{max,1}-p_{02})/(p_{02}-p_{01}) \leq 0.05$, where $p_{01}$ is the first precharge pressure, $p_{02}$ is the second precharge pressure and $p_{max,1}$ is the first maximum pressure. In other words, the process of pressurizing the gas contained in the first volume is usually stopped right when or only shortly after the pressure in the first volume reaches the second precharge pressure.

Further referring to both the proposed charging method and the proposed discharging method, the first precharge pressure may be at least 10 bar, preferably at least 30 bar, more preferably at least 50 bar. The cited values are typical operating pressure values of the main lines of a hydrostatic circuit of a series hydraulic hybrid transmission, for example.

Further referring to both the proposed charging method and the proposed discharging method, the following relation may hold for the first precharge pressure $p_{01}$ and the second precharge pressure $p_{02}$: $p_{02} \geq 2 \cdot p_{01}$, preferably $p_{02} \geq 3 \cdot p_{01}$, more preferably $p_{02} \geq 3.5 \cdot p_{01}$. In other words, the second precharge pressure is preferably close to the maximum feasible/allowable pressure of the gas in the first volume to extend the pressure range of the system as much as possible. For example, the second precharge pressure $p_{02}$ may be at least 90 percent or at least 95 percent of the maximum feasible/allowable pressure of the gas in the first volume.

Furthermore, a hydro-pneumatic energy storage system is proposed. The system comprises:
- a first hydro-pneumatic accumulator comprising a first hollow vessel and, disposed within the first vessel, a first compressible volume containing a first amount of gas;
- a second hydro-pneumatic accumulator comprising a second hollow vessel and, disposed within the second vessel, a second compressible volume containing a second amount of gas;
- a feed pipe;
- at least one control valve selectively fluidly connecting the accumulators to the feed pipe;
- at least one pressure sensor for measuring a hydrostatic pressure in the feed pipe and/or in the accumulators; and
- a control unit for controlling the at least one control valve, the control unit having a charge mode and a discharge mode.

When the control unit is in the charge mode, the control unit is configured to selectively fluidly connect the accumulators to the feed pipe and to selectively fluidly disconnect the accumulators from the feed pipe to carry out the steps of the above described charging method. In contrast, when the control unit is in the discharge mode, the control unit is configured to selectively fluidly connect the accumulators to the feed pipe and to selectively fluidly disconnect the accumulators from the feed pipe to carry out the steps of the above described discharging method.

The system may comprise a compressor unit in fluid communication with the first volume and with the second volume, the compressor being configured to pre-pressurize the gas contained in the first volume to the first precharge pressure by adjusting the first amount of gas, and the compressor being configured to pre-pressurize the gas contained in the second volume to the second precharge pressure by adjusting the second amount of gas.

The first volume and/or the second volume may be formed by one of a closed bladder, an elastic diaphragm and a floating piston, for example.

BRIEF DESCRIPTION OF THE DRAWINGS

Preferred embodiments of the presently proposed system are described in the following detailed description and are depicted in the accompanying drawing in which.

DETAILED DESCRIPTION OF THE INVENTION

It is understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

In a hydraulic hybrid vehicle, the optimal volume and precharge pressure of hydraulic accumulators depend on vehicle and duty cycle characteristics. Normally, accumulator sizing is determined at the design stage and the precharge is defined as a tuning parameter that can be changed at the vehicle setup stage (but not during operation). These parameters are the result of a compromise and may be far from optimal in certain cases.

The invention as described herein uses a rack of accumulators as energy storage, arranged in order to allow a dynamic modification of total volume and/or precharge level, thus increasing the degrees of freedom for the hybrid powertrain control and improving the overall performance by matching the accumulator parameters to the current operating conditions.

Figure 7:
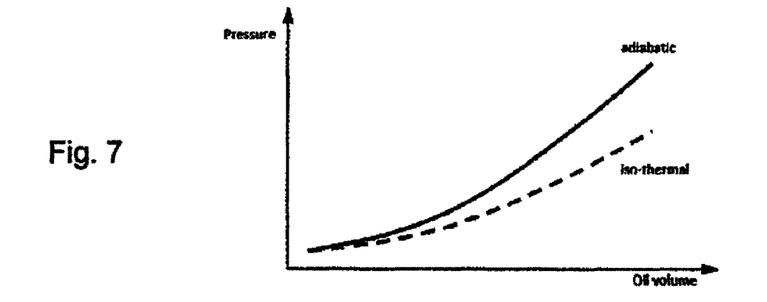
FIG. 7 shows a pressure-volume diagram of a polytropic transformation.
Figure 8:
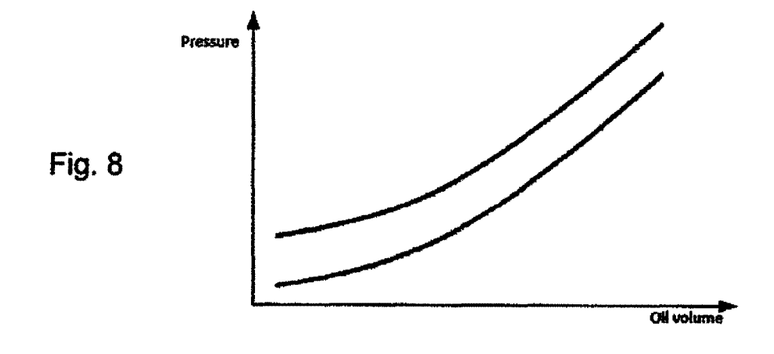
FIG. 8 shows the effect of precharge pressure assuming adiabatic transformations.

Hybrid vehicles typically include a reversible energy storage system (RESS) paired with an internal combustion engine. The RESS enables the following typical hybrid vehicle features:
- Kinetic energy recuperation during braking
- Engine power buffering and optimal management of powertrain operating point A hydraulic rechargeable energy storage device (HRESS) is typically comprised of one or more accumulators, of the bladder or piston type, which store energy by compressing a fixed mass of air, thus increasing its pressure. The pressure increase is directly linked to the thermodynamic transformation of the gas in the accumulator, which can be modeled as a polytropic transformation as represented in FIG. 7, where the effect of the transformation type is highlighted. In most cases, the actual transformation is quite close to adiabatic. FIG. 8 shows the effect of precharge pressure assuming adiabatic transformations. The first part of each curve is flatter than the rest, and corresponds to the initial filling of the accumulator.

One of the most challenging features of hydraulic hybrid systems is the rapid pressure decrease during accumulator discharge, due to the steep change in the pressure-volume curve. This makes the accumulator available only in part of its operating range, where the pressure is sufficiently high, or—if the precharge is set to high values—decreased the overall system efficiency by introducing losses due to flow or displacement partialization. For these reasons, the ideal hydraulic accumulator would maintain its pressure almost constant, so as to be maintained at the most appropriate pressure for the entire volume range. Ideally, the pressure level should be set according to the application and the operating conditions.

On the other hand, given a certain volume of oil exchanged, working in the steep range of the pressure-volume curves increases the accumulator energy density.

In most hybrid applications, the total volume of energy storage is split up into several accumulators, for packaging and cost issues. In the standard configuration, the accumulators are all at the same precharge pressure (at least nominally) and the flow is shared equally among them.

The proposed invention comprises an arrangement of several accumulators that aims at maximizing the HRESS energy density. The solution is shown in FIG. 1.

Each accumulator can be precharged at a different level and can be individually connected to the main pressure line, using either hydraulic controls or electronic controls. In the typical operation, the accumulators are charged in order of increasing precharge: when a pressure threshold is reached on the first accumulator, the corresponding valve closes and the second accumulator is connected, thus changing the pressure-volume characteristics because of the different precharge pressure. The process is then repeated with the third accumulator when the pressure threshold in the second is reached, and so on. Even if all accumulators are precharged at the same level, the individual connection allows for dynamic resizing of the total volume.

Figure 4:
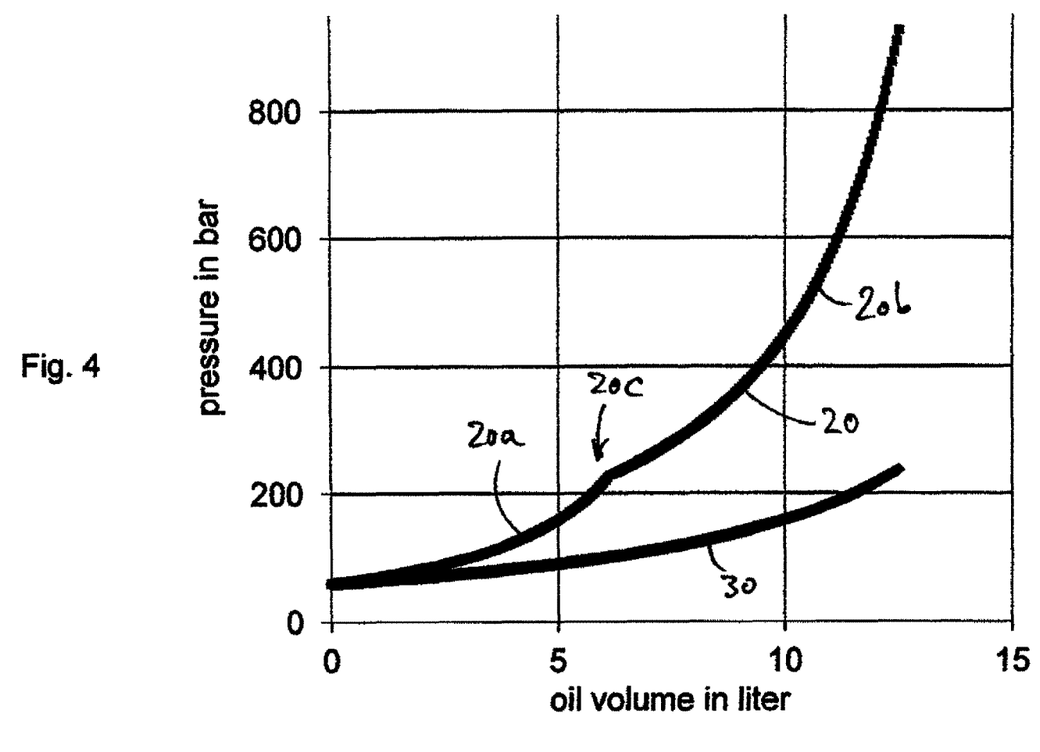
FIG. 4 shows pressure-volume diagrams of a process gas contained in the accumulators of FIGS. 2 and 3.

The connection/disconnection logic can be implemented as a purely hydraulic control with an appropriate combination of pressure-operated valves, or it can be implemented using electronically controlled valves for greater flexibility. In the first case, the resulting HRESS can be integrated into the overall system as a passive component equivalent to a standard accumulator (only with different operating characteristics), with the advantage of increased energy density, as shown in FIG. 4. In the second case, active HRESS management forms an integral part of the hybrid powertrain energy management strategy, since additional degrees of freedom are introduced.

Figure 1:
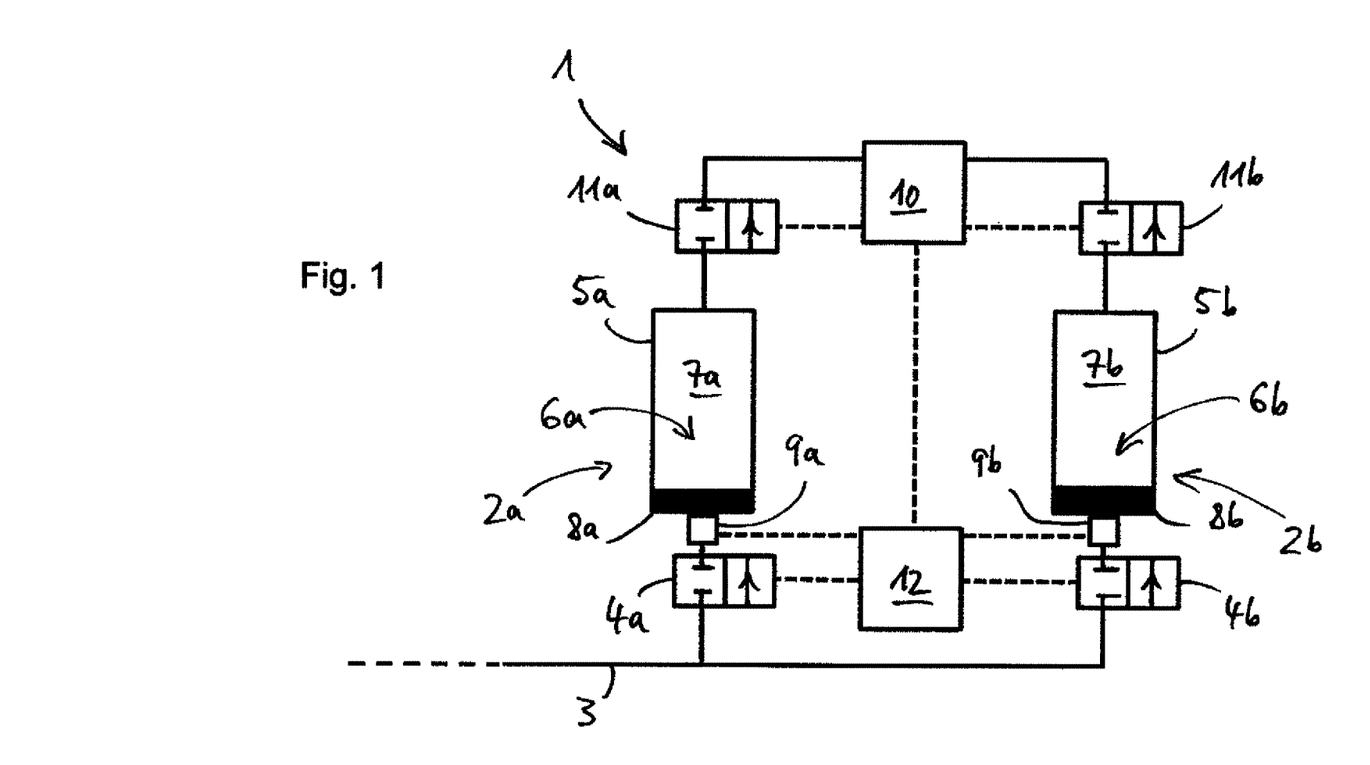
FIG. 1 shows a hydro-pneumatic energy storage system comprising two hydraulic accumulators in fluid communication with a common feed pipe.

FIG. 1 shows a hydro-pneumatic energy storage system 1 in accordance with the present invention. The system 1 comprises a first hydro-pneumatic accumulator 2a and a second hydro-pneumatic accumulator 2b in fluid communication with a common feed pipe 3 through accumulator valves 4a, 4b, respectively. In the simplest case, the accumulator valves 4a, 4b are configured as 2/2-way shut-off valves, respectively.

The first accumulator 2a includes a first rigid vessel 5a enclosing a first storage space 6a. The first vessel 5a is configured to withstand hydrostatic pressures up to a maximum pressure of at least 400 bar, for example. The first storage space 6a comprises a first compressible volume 7a and a first variable space 8a. The first compressible volume 7a is formed by a closed elastic bladder filled with a first amount of a process gas, for example nitrogen. A volume of the process gas contained in the first compressible volume 7a may be expanded up to a first precharge volume of $V_{01}=10$ L. The first accumulator 2a further includes a first pressure sensor 9a configured to determine a hydraulic pressure of non-compressible hydraulic fluid in the first variable volume 8a which is indicative of the pressure of the gas contained in the first volume 7a.

When a hydrostatic pressure of a non-compressible hydraulic fluid in the feed pipe 3 is higher than a hydrostatic pressure of the process gas contained in the first compressible volume 7a, the non-compressible hydraulic fluid may be discharged into the first variable space 8a by opening the shut-off valve 4a, thereby pressurizing the process gas contained in the first compressible space 7a. Similarly, when the hydrostatic pressure of the process gas contained in the first compressible volume 7a is higher than the hydrostatic pressure of the non-compressible fluid in the feed pipe 3, the non-compressible hydraulic fluid contained in the first variable space 8a may be at least partially displaced out of the first variable space 8a and into the feed pipe 3 by opening the valve 4a and thus letting the process gas contained in the first compressible volume 7a expand, thereby creating a fluid flow. The first variable space 8a may be fluidly disconnected from the feed pipe 3 by closing the valve 4a.

Here, the second accumulator 2b is identical to the first accumulator 2a. The second accumulator 2b includes a second rigid vessel 5b enclosing a second storage space 6b. The second storage space 6b comprises a second compressible volume 7b formed by a closed elastic bladder filled with a second amount of the process gas, and a second variable space 8b. A volume of the process gas contained in the second compressible volume 7b may be expanded up to a second precharge volume of $V_{02}=10$ L. Like the first accumulator 4a, the second accumulator 2b includes a second pressure sensor 9b configured to determine a hydraulic pressure of non-compressible hydraulic fluid in the second variable space 8b which is indicative of the pressure of the gas contained in the second volume 7b.

The gas contained in the second compressible volume 7b may be pressurized and depressurized by opening and closing the valve 4b, thereby discharging non-compressible hydraulic fluid from the feed pipe 3 into the second variable space 8b or displacing non-compressible hydraulic fluid contained in the second variable space 8b out of the second variable space 8b and into the feed pipe 3, in the same manner as explained above with respect to the first accumulator 2a.

The feed pipe 3 may be in fluid communication with a hydraulic circuit including at least one hydraulic displacement unit such as a hydrostatic pump and/or a hydrostatic motor. The hydraulic displacement unit may be drivingly engaged or selectively drivingly engaged with an engine of an automotive vehicle or with an output of an automotive vehicle. For example, the feed pipe may provide fluid communication between the hydro-pneumatic energy storage system 1 and the main fluid lines of a hydrostatic circuit of a hydrostatic transmission between the engine of an automotive vehicle and the vehicle output.

The system 1 further includes a compressor 10 in fluid communication with the first compressible volume 7a and with the second compressible volume 7b through compressor valves 11a, 11b, respectively. Here, the valves 11a, 11b are configured as 2/2-way shut-off valves. Through the compressor 10 and the compressor valves 11a, 11b the first amount of the process gas contained in the first compressible volume 7a and the second amount of the process gas contained in the second compressible volume 7b may be increased or decreased. In particular, the compressor 10 may be used to regulate the first precharge pressure $p_{01}$ of the process gas in the first volume 7a and to regulate the first precharge pressure $p_{02}$ of the process gas in the second volume 7b. The precharge pressures $p_{01}$, $p_{02}$ may be regulated independently.

The system 1 further includes an electronic control unit 12 configured to control the valves 4a, 4b, 11a, 11b and the compressor 10. The control unit 10 may include one or more processors, for example. The control unit 12 may control the valves 4a, 4b, 11a, 11b and the compressor 10 independently. The control unit 12 may control the valves 4a, 4b based on an input from an operator and/or based on pressure signals from the pressure sensors 9a, 9b, the pressure signals being indicative of the hydrostatic pressure of the process gas contained in the first and the second compressible volume 7a, 7b, respectively. In particular, the control unit 12 may be operated in a charge mode and in a discharge mode. When operated in the charge mode, the control unit 12 actuates the valves 4a, 4b, 11a, 11b and the compressor 10 according to a method of charging the system 1. When operated in the discharge mode, the control unit 12 actuates the valves 4a, 4b according to a method of discharging the system 1. The charging method and the discharging method are explained in more detail further below.

FIGS. 2a-c show two hydraulic accumulators 13a, 13b at different stages of a method of charging the accumulators 13a, 13b known from the prior art. In order to compare the conventional method illustrated in FIGS. 2a-c with the presently proposed improved method, the accumulators 13a, 13b are assumed to be identical to the accumulators 2a, 2b of the system 1 of FIG. 1.

In a first step shown in FIG. 2a the accumulators 13a, 13b are precharged to the same precharge pressure $p_0$ of 60 bar. In FIG. 2a, a precharge volume of the process gas contained in compressible bladders 14a, 14b is 10 L, respectively, amounting to a total precharge volume of $V_0$=20 L.

Figure 2:
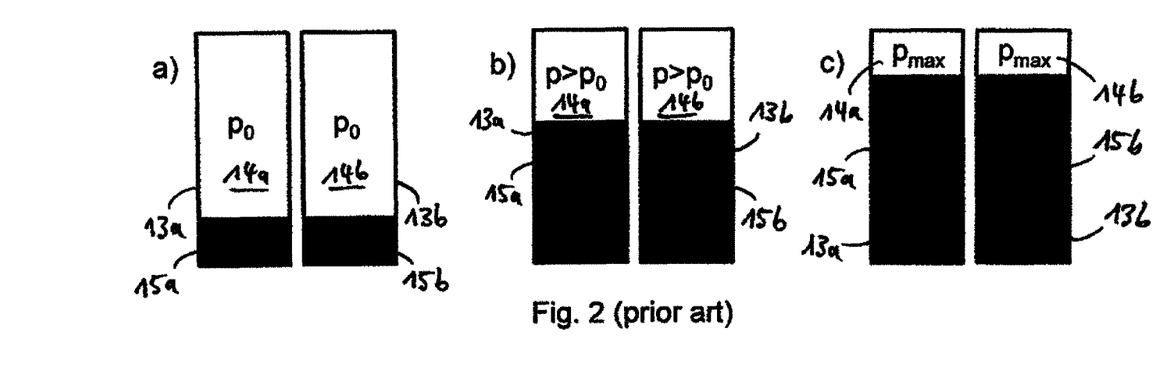
FIGS. 2*a-c* shows different stages of a process of charging/discharging two

According to the known charging method of FIG. 2, the two accumulators 13a, 13b are charged by fluidly connecting the variable spaces 15a, 15b of the accumulators to a common pressurized feed pipe (not shown) and by displacing a non-compressible hydraulic fluid from the feed pipe into the variable spaces 15a, 15b, thereby pressurizing the process gas in the bladders 14a, 14b to a pressure $p>p_0$, as shown in FIG. 2b. As the accumulators 13a, 13b are simultaneously charged through the same feed pipe, the hydrostatic pressure of the gas in the first bladder 14a is at all times equal to the hydrostatic pressure of the gas in the second bladder 14b.

In FIG. 2c the accumulators 13a, 13b are each fully charged to a maximum pressure $p_{max}$. In a bladder-type accumulator pmax is restricted to $p_{max} \approx 4 \cdot p_0$. That is $p_{max} \approx 240$ bar in the example of FIG. 2.

In a known method of discharging the accumulators 13a, 13b of FIG. 2, the above described charging process is simply reversed. In other words, according to the known method of discharging the accumulators 13a, 13b, the non-compressible hydraulic fluid contained in the variable spaces 15a, 15b of the accumulators 13a, 13b of FIG. 2b or 2c is uniformly discharged through the common feed pipe so that the pressure p in the bladders 14a, 14b is at all times equal during the discharge.

The thermodynamic transformation of a fixed amount of a process gas during a compression or expansion may be described by a polytropic transformation:

$$pV^k = p_0 V_0^k. \quad \text{Eq. (1)}$$

The amount of energy E deposited in or gained from the gas when changing the volume of the gas from $V_1$ to $V_2$ is given by the following integral:

$$E = -\int p \cdot dV = \int_1^2 \frac{p_0 V_0^k}{V^k} dV = \frac{p_0 V_0^k}{k-1}(V_2^{1-k} - V_1^{1-k}). \quad \text{Eq. (2)}$$

From Eq. (1) and Eq. (2) it follows that the amount of energy E stored in a gas having a pressure p and a volume V, a precharge pressure $p_0$ and a precharge volume $V_0$ can be expressed as:

$$E(p) = \frac{p_0 V_0^k}{1-k}\left(V_0^{1-k} - \frac{p_0^{\frac{1-k}{k}} V_0^{1-k}}{p^{\frac{1-k}{k}}}\right) \text{ or} \quad \text{Eq. (3)}$$

$$E(V) = \frac{p_0 V_0^k}{1-k}(V_0^{1-k} - V^{1-k}). \quad \text{Eq. (4)}$$

The practically realizable maximum amount of energy that may be deposited in the gas can be determined by replacing the pressure p in Eq. (3) by the maximum feasible pressure. For a bladder-type accumulator that value is given by $p_{max} \approx 4 \cdot p_0$, yielding:

$$E_{max,bladder} = \frac{p_0 V_0}{k-1}\left(1 - 4^{\frac{k-1}{k}}\right). \quad \text{Eq. (5)}$$

For nitrogen (k=1.4) that value is given by $E_{max,bladder} \approx 1.215 \cdot p_0 \cdot V_0$.

FIG. 4 shows the pressure $p(V_{OIL})$ (reference sign 30) of the gas contained in the bladders 14a, 14b of the accumulators 13a, 13b of FIG. 2 during its compression from the precharge volume $V_0$=20 L shown in FIG. 2a to the minimum volume shown in FIG. 2c. The pressure $p(V_{OIL})$ in FIG. 4 is plotted as a function of the volume $V_{OIL}$ of the non-compressible hydraulic fluid discharged into the variable spaces 15a, 15b, whereby $p(V_{OIL})$ is determined according to Eq. (1) and according to $V_{OIL}=V_0-V$. The values used are $V_0$=20 L, $p_0$=60 bar and the adiabatic index of nitrogen k=1.4. In FIG. 4 the pressure 30 is gradually increased from the precharge pressure $p_0$=60 bar in FIG. 2a to the maximum feasible pressure of the accumulators 13a, 13b $p_{max}$=4·$p_0$=240 bar shown in FIG. 2c. The area underneath the curve 30 in FIG. 4 represents the amount of energy deposited in the gas contained in the accumulators 13a, 13b during the compression.

Figure 5:
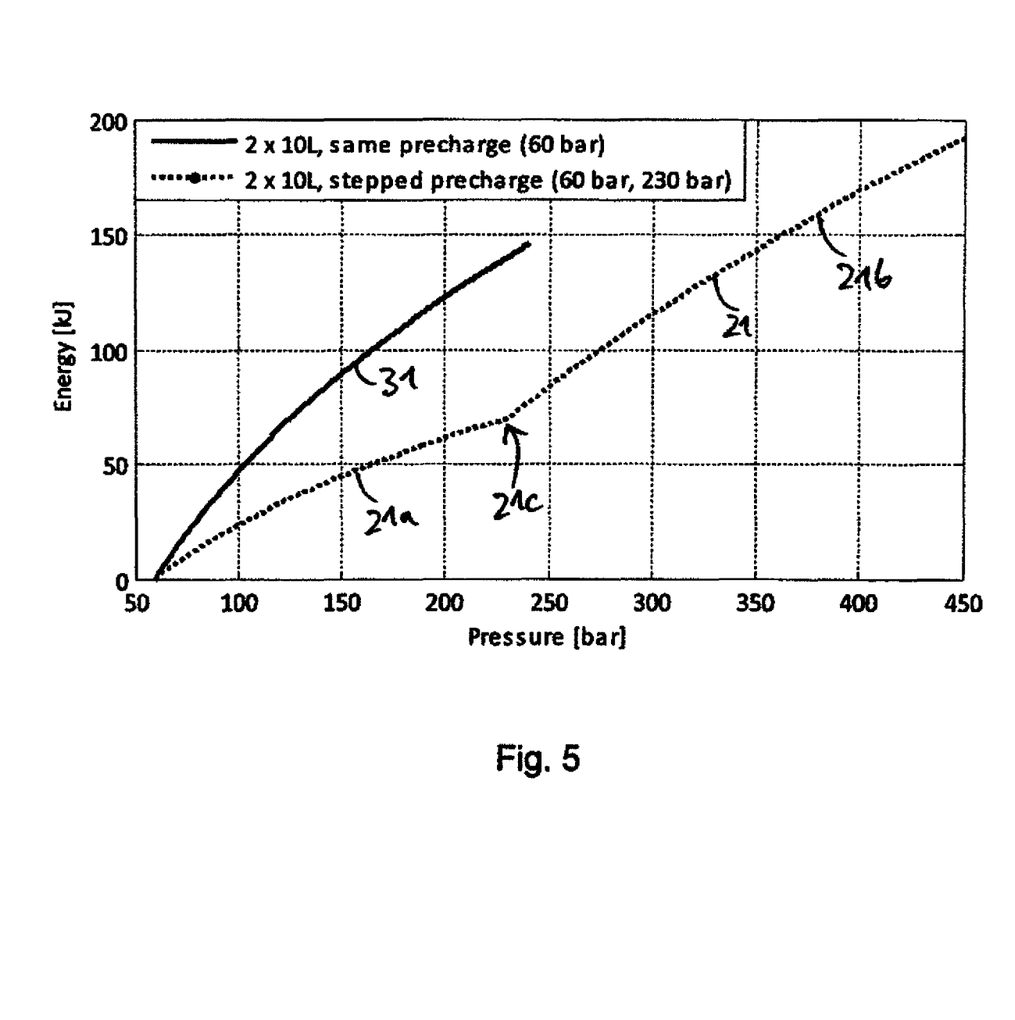
FIG. 5 shows energy-pressure diagrams of the process gas contained in the accumulators of FIGS. 2 and 3.

FIG. 5 shows the energy E(p) (reference sign 31) deposited in the gas contained in the bladders 14a, 14b as a function of the uniform pressure p of the gas during the process illustrated in FIGS. 2a-c. E(p) in FIG. 5 is determined according to Eq. (3). Again, $V_0$=20 L, $p_0$=60 bar and k=1.4. Again, it can be seen that the pressure p of the nitrogen gas contained in the bladders 14a, 14b is increased to its maximum pressure $p_{max}$=4·$p_0$=240 bar. During this process, the amount of energy deposited in the gas increases until it reaches its maximum value of roughly 150 kJ.

Figure 6:
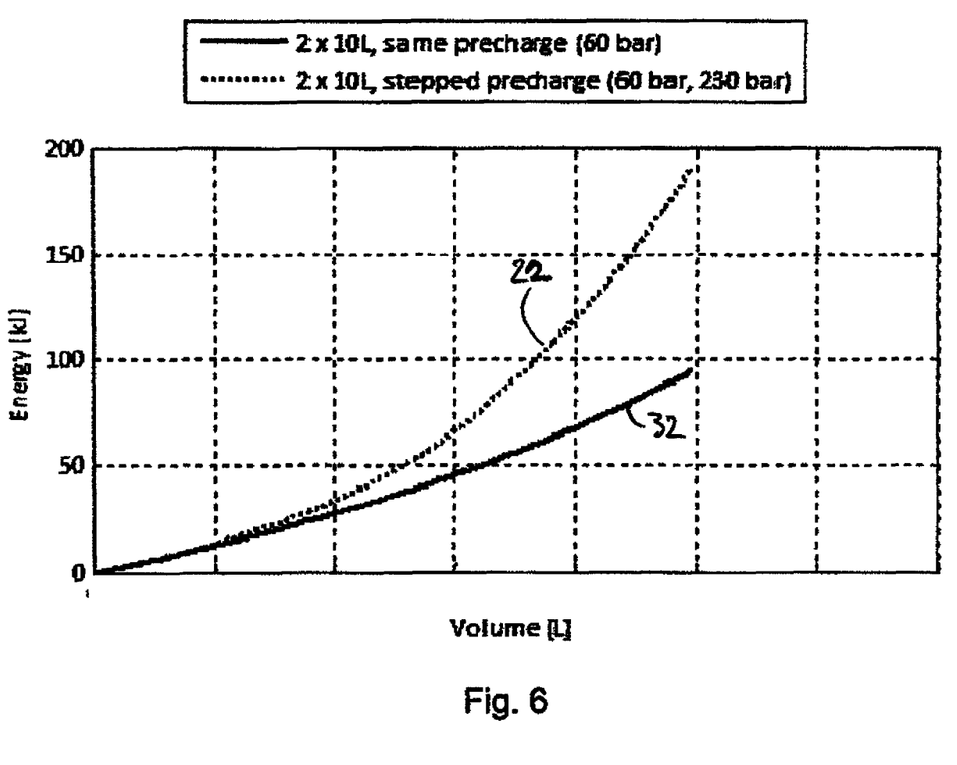
FIG. 6 shows energy-volume diagrams of the process gas contained in the accumulators of FIGS. 2 and 3.

FIG. 6 shows the energy $E(V_{OIL})$ (reference sign 32) deposited in the gas contained in the bladders 14a, 14b as a function of the volume $V_{OIL}$ of the non-compressible hydraulic fluid discharged into the variable spaces 15a, 15b during the charging process. $E(V_{OIL})$ in FIG. 6 is determined according to Eq. (4) and according to $V_{OIL}=V_0-V$. FIG. 6 does not show the complete charging process. Again, $V_0$=20 L, $p_0$=60 bar and k=1.4 in FIG. 6. As the gas is compressed, the amount of energy deposited in the gas increases.

Figure 3:
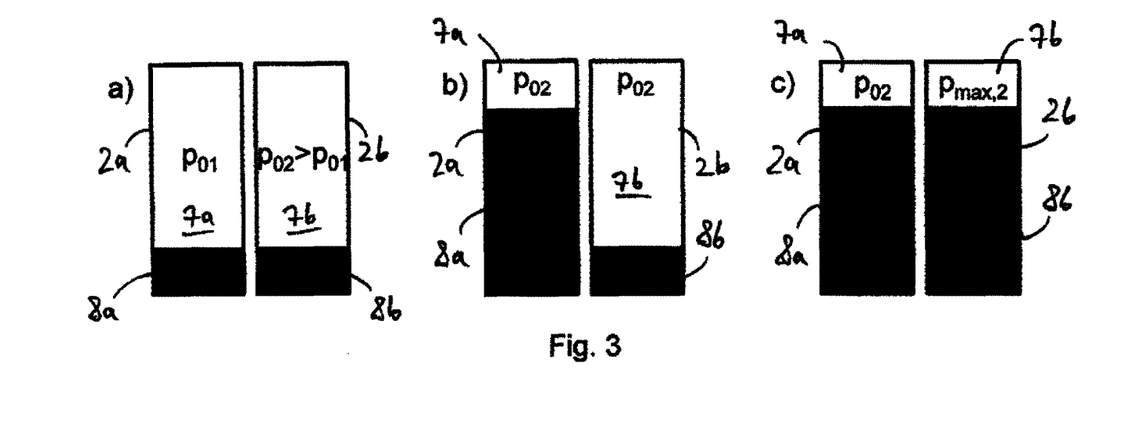
FIGS. 3*a-c* shows different stages of a process of charging/discharging the two hydraulic accumulators of FIG. 1.

FIGS. 3a-c show different stages of the presently proposed method of charging the hydro-pneumatic energy storage system 1 of FIG. 1. The method may be initiated by a command from an operator through one or more input devices or by a control algorithm. The method is carried out using a charge mode of a control algorithm that is run on a processor of the electronic control unit 12.

FIG. 3a shows a first step of the proposed method of charging the system 1. In the first step, the control unit 12 commands the compressor 10 to adjust the amount of nitrogen gas contained in the first volume 7a of the first accumulator 2a through the compressor valve 11a to pre-pressurize the gas in the first volume 7a to a first precharge pressure $p_{01}$ of 60 bar at a precharge volume of $V_{01}$=10 L. Once the precharge pressure $p_{01}$ has been set, the control unit 12 commands the compressor valve 11a to close. Still referring to FIG. 3a, the control unit 12 then commands the compressor 10 to adjust the amount of nitrogen gas contained in the second volume 7b of the second accumulator 2b through the compressor valve 11b to pre-pressurize the gas in the second volume 7b to a second precharge pressure $p_{02}$ of 230 bar at a precharge volume of $V_{02}$=10 L. Thus, the second precharge pressure $p_{02}$ of the nitrogen gas contained in the second volume 7b of the second accumulator 2b is only slightly smaller than the maximum feasible pressure of about $4 \cdot p_{01} = 240$ bar of the first bladder accumulator 2a. Once the precharge pressure $p_{02}$ has been set, the control unit 12 commands the valve 11b to close. The valves 4a, 4b remain closed during the first step of FIG. 3a.

After the first volume 7a and the second volume 7b have been pre-pressurized, the accumulators 2a, 2b are ready for non-compressible hydraulic fluid to be discharged into the variable space 8a of the first accumulator. The value of the first precharge pressure $p_{01}$ is preferably chosen such that it matches a typical operating pressure of the hydraulic circuit to which the system 1 is coupled for the charging process. Depending on the particular situation, different values of the first precharge pressure $p_{01}$ may be chosen.

Once the pressure in the common feed pipe 3 of the accumulators 2a, 2b reaches or exceeds the first precharge pressure $p_{01}$ of the first accumulator 2a, the control unit 12 commands the first accumulator valve 4a to open to fluidly connect the first variable space 8a of the first accumulator 2a to the feed pipe 3. At the same time, the second accumulator valve 4b remains closed, thereby fluidly disconnecting the second accumulator 2b from the feed pipe 3.

Upon opening the first accumulator valve 4a, non-compressible hydraulic fluid, typically oil, is discharged into the first variable space 8a of the first accumulator 2a through the feed pipe 3, thereby compressing the first volume 7a and increasing the hydrostatic pressure $p_1$ of the nitrogen gas contained in the first volume 7a. The feed pipe 3 may be pressurized by a hydrostatic pump/motor of a hydrostatic transmission of a vehicle which is driven by an internal combustion engine of the vehicle, or by a vehicle output of the vehicle during a regenerative braking procedure, for example. During the charging of the first accumulator 2a, the control unit 12 keeps the second accumulator valve 4b shut to keep the hydrostatic pressure of the second accumulator 4b at the second precharge pressure $p_{02}$.

The first volume 7a is further pressurized until the hydrostatic pressure $p_1$ of the gas contained in the first volume reaches the second precharge pressure $p_{02}$. Up to this point, the second accumulator valve 4b is kept closed. The situation now reached is illustrated in FIG. 3b. The gas contained in both volumes 7a, 7b is pressurized to the second precharge pressure $p_{02}$. However, whereas the first volume 7a has been almost fully compressed, the second volume 7b is still at the precharge volume of $V_{02} = 10$ L.

In FIG. 4, the pressure $p(V_{OIL})$ in the first volume 7a during the compression from $p = p_{01}$ in FIG. 3a to $p = p_{02}$ in FIG. 3b is represented by a first section 20a of the curve 20. As only the first volume 7a is charged during this stage, the increase in pressure represented by the section 20a of the curve 20 in FIG. 4 is larger than the corresponding increase in pressure in the conventional method caused by the same quantity of oil. In other words, for a given volume of non-compressible hydraulic fluid dischared into the system 1, more energy is deposited in the case of the presently proposed method than in the case of the conventional method.

This is further illustrated in FIG. 6 where the curve 22 representing the amount of energy $E(V_{OIL})$ deposited in the system 1 of FIG. 1 according to the presently proposed method lies above the curve 32 representing the conventional method.

In FIG. 3b, as the pressure in the first volume 7a and/or in the feed pipe 3 reaches the second precharge pressure $p_{02}$, the control unit 12 commands the first accumulator valve 4a to close. Thus, the first accumulator 2a is fluidly disconnected from the feed pipe 3 in order to keep the pressure of the compressed gas in the first accumulator 2a at the second precharge pressure $p_{02}$. At the same time, the control unit 12 commands the second accumulator valve 4b to open. Thus, the second accumulator 2b is fluidly connected to the feed pipe 3 and non-compressible hydraulic fluid is discharged into the second variable volume 8b of the second accumulator 2b through the feed pipe 3.

However, it is conceivable that the disconnection of the first accumulator 2a from the feed pipe 3 and the connection of the second accumulator 2b to the feed pipe 3 do not occur at the same time. For example, once the second accumulator 2b is fluidly connected to the feed pipe 3 the first accumulator 2a could remain fluidly connected to the feed pipe 3 until the gas in the first volume 7a reaches the maximum feasible pressure $p_{max,1} 4 \cdot p_{01}$. In other words, for some time non-compressible hydraulic fluid can be discharged into the two accumulators 2a, 2b in parallel/simulataneously. This may smoothen the transition from the charging of the first accumulator 2a to the charging of the second accumulator 2b.

In FIGS. 4 and 5, the transition from the charging of the first accumulator 2a to the charging of the second accumulator 2b is visible as a point where the curves 20, 21 are not smooth. In FIGS. 4 and 5 this transition point is indicated at 20c, 21c, respectively. The transition point 20c in FIG. 4 divides the curve 20 in two sections 20a, 20b. Similarly, the transition point 21c in FIG. 5 divides the curve 21 in two sections 21a, 21b. The sudden change in the rate at which $p(V_{OIL})$ and $E(p)$ increase at 20c, 21c, respectively, is due to the change in the gas volume coupled to the feed pipe 3 at the transition point. While, at 20c and 21c, the gas volume 7a of the first accumulator 2a is almost fully compressed, the gas volume 7b of the second accumulator 2b is still at its precharge value $V_{02}$.

Once the second accumulator valve 4b is opened, non-compressible hydraulic fluid is discharged into the second variable volume 8b of the second accumulator 2b and the second gas volume 7b of the second accumulator 2b is compressed until it reaches its maximum feasible value of $p_{max,2} \approx 4 \cdot p_{02} = 4 \cdot 230$ bar $= 920$ bar. During this state, the first accumulator valve 4a is kept closed to keep the quantity of oil in the first variable space 8a and the pressure in the first volume 7a constant. The accumulators 2a, 2b in their state of maximum charge are illustrated in FIG. 3c.

FIGS. 4 and 5 clearly show that whereas in the conventional method (see curves 30, 31 in FIGS. 4 and 5, respectively) the maximum pressure to which the process gas in the accumulators 13a, 13b may be compressed is limited to $p_{max} = 4 \cdot p_0 = 240$ bar, in the presently proposed method (see curves 20, 21 in FIGS. 4 and 5, respectively) the range of the accessible pressure may be extended to a value of up to $p_{max,2} \approx 4 \cdot p_{02} = 920$ bar. As a result more energy can be stored when charging the system according to the presently proposed method. In practice, the maximum pressure value may be limited by the maximum pressure of the hydraulic circuit to which the system 1 is connected. For example, in a hydrostatic transmission of an automotive vehicle the maximum operating pressure is typically in the range of 450 bar.

A skilled person readily understands that the charging method proposed herein and illustrated in FIGS. 3-6 can be extended to more than two accumulators. These may then be pre-pressurized to different precharge pressures and charged sequentially, in analogy to the charging of the two-accumulator system 1 described above. For example, each accumulator of an n-accumulator system can be pre-pressurized up to a precharge pressure $p_{0,j} = p_{max,j-1} = 4 \cdot p_{0,j-1}$, where j−1 denotes the accumulator preceding the $j^{th}$ accumulator.

From the foregoing description of the method of charging the system 1 it is immediately apparent to a skilled person how the system can be discharged in order to arrive at the precharge state depicted in FIG. 3a. Thus, a corresponding method of discharging the system 1 when the first volume 7a contains an amount of process gas pressurized to a first maximum pressure and when the second volume 7b contains an amount of precess gas pressurized to a second maximum pressure, the second maximum pressure being larger than or at least equal to the first maximum pressure, comprises at least the following steps:

letting the gas contained in the second volume 7b expand to at least partially displace the non-compressible hydraulic fluid contained in the second vessel 5b out of the second vessel 5b while keeping the quantity of non-compressible hydraulic fluid contained in the first vessel 5a constant;

when the pressure of the gas contained in the second volume 7b has fallen to the first maximum pressure, letting the gas contained in the first volume 7a expand to at least partially displace the non-compressible hydraulic fluid contained in the first vessel 5a out of the first vessel 5a;

when the pressure of the gas contained in the second volume 7b has fallen to a second pre-charge pressure which is equal to or smaller than the first maximum pressure, halting the expansion of the gas contained in the second volume 7b to keep the pressure of the gas contained in the second volume 7b at the second pre-charge pressure; and     when the pressure of the gas contained in the first volume 7a has fallen to a first pre-charge pressure which is smaller than the second pre-charge pressure, halting the expansion of the gas contained in the first volume 7a to keep the pressure of the gas contained in the first volume 7a at the first pre-charge pressure.

The invention claimed is:

1. A method of charging a hydro-pneumatic energy storage system, the energy storage system comprising a first hydro-pneumatic accumulator comprising a first hollow vessel and, disposed within the first hollow vessel, a first compressible volume containing a first amount of gas, and the system comprising a second hydro-pneumatic accumulator comprising a second hollow vessel and, disposed within the second hollow vessel, a second compressible volume containing a second amount of gas, the method comprising the steps of:

pre-pressurizing the gas contained in the first volume to a first hydrostatic pre-charge pressure and pre-pressurizing the gas contained in the second volume to a second hydrostatic pre-charge pressure, the second pre-charge pressure being higher than the first pre-charge pressure;

pressurizing the gas in the first volume by discharging a non-compressible hydraulic fluid into the first vessel while keeping a quantity of non-compressible hydraulic fluid contained in the second vessel constant to keep the pressure of the gas contained in the second volume at the second pre-charge pressure; and,     when the pressure of the gas in the first volume reaches the second pre-charge pressure, pressurizing the gas in the second volume by discharging a non-compressible hydraulic fluid into the second vessel.

2. The method of claim 1, further including the step of keeping the quantity of non-compressible hydraulic fluid contained in the first vessel constant to keep the pressure of the gas in the first volume at the first maximum pressure when the pressure of the gas in the first volume reaches a first maximum pressure which is equal to or higher than the second pre-charge pressure.

3. The method of claim 1, wherein pre-pressurizing the gas contained in the first volume to the first pre-charge pressure includes adjusting the first amount of gas, and wherein pre-pressurizing the gas contained in the second volume to the second hydrostatic pre-charge pressure includes adjusting the second amount of gas.

4. The method of claim 1, wherein the non-compressible hydraulic fluid is discharged into the first vessel and into the second vessel through a hydraulic displacement unit driven by an engine or by a vehicle output of an automotive vehicle.

5. A method of discharging a hydro-pneumatic energy storage system, the system comprising a first hydro-pneumatic accumulator comprising a first hollow vessel and, disposed within the first vessel, a quantity of a non-compressible hydraulic fluid and a first volume containing a first amount of gas at a first maximum hydrostatic pressure, and the system comprising a second hydro-pneumatic accumulator comprising a second hollow vessel and, disposed within the second vessel, a quantity of a non-compressible hydraulic fluid and a second volume containing a second amount of gas at a second maximum hydrostatic pressure, the second maximum pressure being higher than or equal to the first maximum pressure, the method comprising the steps of:

letting the gas contained in the second volume expand to at least partially displace the non-compressible hydraulic fluid contained in the second vessel out of the second vessel while keeping the quantity of non-compressible hydraulic fluid contained in the first vessel constant;

when the pressure of the gas contained in the second volume has fallen to the first maximum pressure, letting the gas contained in the first volume expand to at least partially displace the non-compressible hydraulic fluid contained in the first vessel out of the first vessel;

when the pressure of the gas contained in the second volume has fallen to a second pre-charge pressure which is equal to or smaller than the first maximum pressure, halting the expansion of the gas contained in the second volume to keep the pressure of the gas contained in the second volume at the second pre-charge pressure; and     when the pressure of the gas contained in the first volume has fallen to a first pre-charge pressure which is smaller than the second pre-charge pressure, halting the expansion of the gas contained in the first volume to keep the pressure of the gas contained in the first volume at the first pre-charge pressure.

6. The method of claim 5, wherein the non-compressible hydraulic fluid displaced out of the first vessel and out of the second vessel drives a hydraulic displacement unit drivingly engaged with an engine or with a vehicle output of an automotive vehicle.

7. The method of claim 5, wherein a ratio of the first maximum pressure less the second pre-charge pressure to the second pre-charge pressure less the first pre-charge pressure is less than or equal to 0.2.

8. The method of claim 7, wherein the ratio of the first maximum pressure less the second pre-charge pressure to the second pre-charge pressure less the first pre-charge pressure is less than or equal to 0.1.

9. The method of claim 5, wherein the first pre-charge pressure is at least 10 bar.

10. The method of claim 9, wherein the first pre-charge pressure is at least 30 bar.

11. The method of claim 10, wherein the first pre-charge pressure is at least 50 bar.

12. The method of claim 5, wherein the second pre-charge pressure is at least twice the first pre-charge pressure.

13. The method of claim 12, wherein the second pre-charge pressure is at least three times the first pre-charge pressure.

14. The method of claim 13, wherein the second pre-charge pressure is at least 3.5 times the first pre-charge pressure.

15. A hydro-pneumatic energy storage system, comprising:
- a first hydro-pneumatic accumulator comprising a first hollow vessel and, disposed within the first vessel, a first compressible volume containing a first amount of gas;
- a second hydro-pneumatic accumulator comprising a second hollow vessel and, disposed within the second vessel, a second compressible volume containing a second amount of gas;
- a feed pipe;
- at least one control valve selectively fluidly connecting the accumulators to the feed pipe;
- at least one pressure sensor for measuring a hydrostatic pressure in the feed pipe and/or in the accumulators; and
- a control unit for controlling the at least one control valve, the control unit having a charge mode and a discharge mode;

wherein, when the control unit is in the charge mode, the control unit is configured to selectively fluidly connect the accumulators to the feed pipe and to selectively fluidly disconnect the accumulators from the feed pipe by pre-pressurizing the gas contained in the first volume to a first hydrostatic pre-charge pressure and pre-pressurizing the gas contained in the second volume to a second hydrostatic pre-charge pressure, the second pre-charge pressure being higher than the first pre-charge pressure; pressurizing the gas in the first volume by discharging a non-compressible hydraulic fluid into the first vessel while keeping a quantity of non-compressible hydraulic fluid contained in the second vessel constant to keep the pressure of the gas contained in the second volume at the second pre-charge pressure; and, when the pressure of the gas in the first volume reaches the second pre-charge pressure, pressurizing the gas in the second volume by discharging a non-compressible hydraulic fluid into the second vessel; and wherein, when the control unit is in the discharge mode, the control unit is configured to selectively fluidly connect the accumulators to the feed pipe and to selectively fluidly disconnect the accumulators from the feed pipe by letting the gas contained in the second volume expand to at least partially displace the non-compressible hydraulic fluid contained in the second vessel out of the second vessel while keeping the quantity of non-compressible hydraulic fluid contained in the first vessel constant; when the pressure of the gas contained in the second volume has fallen to the first maximum pressure, letting the gas contained in the first volume expand to at least partially displace the non-compressible hydraulic fluid contained in the first vessel out of the first vessel; when the pressure of the gas contained in the second volume has fallen to a second pre-charge pressure which is equal to or smaller than the first maximum pressure, halting the expansion of the gas contained in the second volume to keep the pressure of the gas contained in the second volume at the second pre-charge pressure; and when the pressure of the gas contained in the first volume has fallen to a first pre-charge pressure which is smaller than the second pre-charge pressure, halting the expansion of the gas contained in the first volume to keep the pressure of the gas contained in the first volume at the first pre-charge pressure.

16. The hydro-pneumatic energy storage system of claim 15, further comprising a hydraulic displacement unit in fluid communication with the accumulators through the feed pipe, the hydraulic displacement unit being drivingly engaged or selectively drivingly engaged with at least one of an engine of an automotive vehicle, a vehicle output of an automotive vehicle and a hydraulic implement.

17. The hydro-pneumatic energy storage system of claim 15, further comprising a compressor in fluid communication with the first volume and with the second volume, the compressor being configured to pre-pressurize the gas contained in the first volume to the first pre-charge pressure by adjusting the first amount of gas, and the compressor being configured to pre-pressurize the gas contained in the second volume to the second pre-charge pressure by adjusting the second amount of gas.

18. The hydro-pneumatic energy storage system of claim 15, wherein the first volume and/or the second volume are formed by one of a closed bladder, an elastic diaphragm and a floating piston.

* * * * *